INVENTOR
PERRY ARANT

INVENTOR
PERRY ARANT
BY
Bacon & Thomas
ATTORNEYS

United States Patent Office 3,522,909
Patented Aug. 4, 1970

3,522,909
INSTANTANEOUS HIGH-IMPACT FLUID JET CLEANING SYSTEMS
Perry Arant, Newport Beach, Calif., assignor to Clayton Manufacturing Company, El Monte, Calif., a corporation of California
Filed June 26, 1968, Ser. No. 740,249
Int. Cl. B05b 9/00
U.S. Cl. 239—127                    11 Claims

ABSTRACT OF THE DISCLOSURE

High-impact fluid jet steam and/or hot water cleaning systems comprising a steam generator having a heating coil connected in a closed circulating system with a pressure vessel so that the same heating medium is continuously withdrawn from the pressure vessel, heated in the heating coil to the desired temperature, and then discharged back into the pressure vessel. A heat exchange coil is located within the pressure vessel. The solution to be heated is circulated through the heat exchange coil so that it is indirectly heated in the pressure vessel while passing through the heat exchange coil. The inlet of the heat exchange coil is connected with a solution supply tank and its outlet is connected with a nozzle. In one form of the invention, a thermostat valve at the inlet side of the nozzle control valve automatically opens to effect return of the solution to the supply tank when its temperature drops below a predetermined value, thereby assuring that fluid of the desired temperature is continuously available at the nozzle control valve.

In another form of the invention, the thermostat valve is omitted and a Y-fitting is connected with the inlet of the control valve and with the outlet of the heat exchange coil and with a return bypass arrangement so that some of the solution is continuously bypassed without being returned to the supply to thus continuously make available fluid at the desired temperature, at the inlet to the nozzle control valve.

In a third embodiment, a thermostat blending valve is connected with the inlet of the nozzle control valve and arranged in the system so that unheated solution is mixed with heated solution to provide a high-impact liquid cleaning jet of the desired temperature.

A fourth embodiment includes two heat exchange coils in the pressure vessel, each connected with a separate nozzle so that the same apparatus can supply a high-impact steam jet or a high-impact heated liquid jet simultaneously and independently of each other.

A fifth embodiment includes a single heat exchange coil and two discharge nozzles connected in the system so that either a high-impact steam jet or a high-impact hot water jet can be provided, but not simultaneously.

BACKGROUND OF THE INVENTION

Field of the invention

This invention relates generally to cleaning systems of the type wherein pressurized hot liquid, steam, or a combination of liquid and steam is discharged as a jet through a discharge nozzle against a surface or object to be cleaned. More particularly, the invention relates to an improved cleaning system wherein high pressure fluid at a desired temperature is instantly available to the discharge nozzle of the system upon opening of a control valve connected to the inlet of the nozzle.

Description of the prior art

In a conventional steam cleaning system, liquid solution is drawn from a supply, and is pumped through the heating coil of a steam generator. The steam generator coil is heated by a burner and the coil outlet is connected by a conduit and control valve to a discharge nozzle of the hand-held wand or cleaning gun type. When the control valve of the nozzle is opened, heated fluid under pressure is discharged as a jet from the nozzle to effect a cleaning operation.

There are certain problems with such a conventional system, especially when the nozzle control valve is operated only periodically, with a substantial time delay between periods of use. Under these conditions, the fluid contained in the conduit connecting the heating coil with the nozzle will cool substantially, especially if, as is usual, the conduit is of substantial length. This results in the initial discharge of cool or cold liquid when the nozzle control valve is first opened and continues for a period of time depending on the conduit length, until relatively hot fluid from the coil reaches the nozzle.

Another problem with the above conventional steam cleaning system occurs when liquid remains stationary within the heating coil of the steam generator unit for long periods between successive operations of the nozzle. Because the heating coil is exposed directly to a high temperature heating unit, or to the residual heat in the combustion chamber during burner cut off periods, the temperature of the fluid within the heating coil increases during the period of idleness. Thus, when the nozzle is used after a lengthy period of idleness, a flow of cool or cold liquid will first occur, this being the liquid contained in the conduit connecting the coil with the nozzle; followed by the discharge of the very hot or superheated fluid that remained stationary in the heating coils during the period of idleness. Only after these two flows have been dicsharged will the normal, desired cleaning jet be obtained from the system.

It is highly preferable to have fluid of the desired temperature and pressure available at the nozzle instantly upon the opening of its control valve. If only cold or cool liquid is available, the desired high-impact cleaning operation is delayed and a wasteful period of liquid flow occurs. One purpose of the present invention is to alleviate this problem, and to provide various cleaning systems wherein pressurized fluid of the desired character and temperature is instantly and always available at the valve controlling the discharge nozzle when the system is in operation.

SUMMARY OF THE INVENTION

The present cleaning systems include a steam generator unit of the type having a heating coil that is heated by a fuel burner or other suitable heating element. A heat exchanger is also provided, and comprises a pressure vessel through which at least one heat exchange coil extends. The pressure vessel includes an inlet and an outlet, which are connected in a closed loop arrangement, or closed circulating system, with the outlet and the inlet, respectively, of the steam generator heating coil. A pump is connected in the closed loop, and continuously circulates liquid from the pressure vessel through the heating coil, where it is heated sufficiently to flash into steam upon return to the pressure vessel. The operation of the pump and the burner are controlled automatically by conventional controls (not shown), with the result that the interior of the pressure vessel is maintained at a relatively constant pressure and temperature.

The heat exchange coil contains the cleaning solution (water and detergent) and is utilized to transfer heat from within the pressure vessel to the liquid cleaning solution to heat the same to a desired temperature, which temperature can never exceed that within the pressure vessel. Thus, direct heating of the cleaning solution by the burner is avoided, and the problems of scaling and excessively raising the temperature of the solution during the periods of idleness in the operation of the system are alleviated.

The liquid cleaning solution for the system is contained in a supply tank connected by a supply conduit to the inlet of the heat exchange coil. A pump is installed between the tank and the heat exchange coil inlet, and preferably operates continuously. A bypass conduit with a pressure responsive bypass valve connected therein is connected between the supply conduit and the supply tank, at a point downstream of the pump and functions to bypass liquid from the pump back into the tank when the nozzle is not in operation.

The outlet of the heat exchange coil is connected by a conduit and a control valve to the inlet of a suitable nozzle, the valve being positioned immediately adjacent to the nozzle inlet. Thus, when the valve is opened fluid flows from the heat exchange coil, through the nozzle; the liquid supply pump providing liquid to the heat exchange coil to replace the fluid discharged from the nozzle. To avoid the problem common to conventional steam cleaning apparatus of cool or cold fluid flowing from the nozzle when the flow control valve is first opened, unique apparatus is employed to assure a ready supply of fluid, at the desired temperature and pressure, instantly upon opening of the control valve.

In one embodiment of the invention, a thermally responsive (thermostat) valve is installed immediately ahead of the nozzle control valve, with its outlet port connected with the inlet of the control valve. The inlet port of the thermostat valve is connected with a conduit leading from the heat exchange coil outlet. This valve also includes a bypass port that is connected to a conduit leading back to the liquid solution tank.

A thermally responsive valve acts as a bypass valve, and is set to open a passage between its inlet and bypass ports when the temperature of the fluid at the valve falls below a selected value, whereby flow from the heat exchange coil back to the supply tank results. This causes the subtemperature fluid within the conduit leading to the thermostat valve to be replaced by heated fluid from the heat exchange coil, and results in a constant and instantaneously available supply of suitably heated fluid to the nozzle.

In a second embodiment of the invention, the thermostat valve is omitted and replaced by other means that will insure an instantaneously available supply of heated fluid. Thus, the stem of a Y-fitting is connected to the inlet of the control valve, and the conduit leading from the heat exchange coil is connected to one leg of the fitting. The remaining leg of the fitting is connected by conduit means and a solution recirculating pump to the conduit supplying liquid to the inlet of the heat exchange coil. The solution recirculating pump operates continuously to recirculate, or bypass, a fractional amount of fluid, and thus functions to ensure a constant and instantly available supply of heated fluid to the nozzle.

Both of the embodiments just described are especially suited for supplying high pressure, superheated fluid to the nozzle, which provides a jet of steam and some unflashed liquid when the nozzle control valve is opened.

A third embodiment of the invention is designed to instantly supply hot liquid below boiling temperature to the nozzle. This embodiment includes a thermostat blending valve installed immediately adjacent to the control valve. A conduit leading from the conduit supplying liquid to the heat exchange coil is connected to the blending valve. The blending valve functions, when the nozzle control valve is opened, to blend unheated liquid with the hot fluid from the heat exchange coil, to provide a high-impact hot water jet of the desired temperature.

The invention also contemplates a combination hot liquid and steam system, utilizing either one or two heat exchange coils. In the first instance, using one heat exchange coil, either hot liquid or steam is available, but not both at the same time. The use of two heat exchange coils makes possible the simultaneous and independent provision of both, high-impact hot liquid and high-impact steam cleaning jets.

It is the principal object of the present invention to provide a cleaning system designed to deliver fluid of a desired character to a discharge nozzle instantly upon opening of the valve controlling flow through the nozzle.

Another object is to provide a cleaning system wherein liquid cleaning solution is heated indirectly, rather than directly, whereby the temperature of the solution can be maintained uniform and more easily controlled.

Still another object is to provide apparatus for heating a liquid solution, comprising a heat exchanger and a steam generator connected in a closed loop system so that the same liquid heating medium is continuously circulated through the apparatus and repeatedly reheated.

A further object is to provide a cleaning system designed to deliver either a high-impact steam or hot liquid jet through a discharge nozzle, with the jet fluid in either instance being substantially constant in temperature.

A still further object is to provide means connecting a discharge nozzle with a source of heated fluid, designed to instantly supply fluid at a uniform desired temperature and pressure to the nozzle even though the nozzle may be many feet from the heated fluid source, and even though the nozzle may be operated infrequently.

Other objects and many of the attendant advantages of the invention will become readily apparent from the following description of the preferred embodiments, when taken together with the accompanying drawings.

DESCRIPTION OF THE PREFERRED EMBODIMENTS

Figure 1:
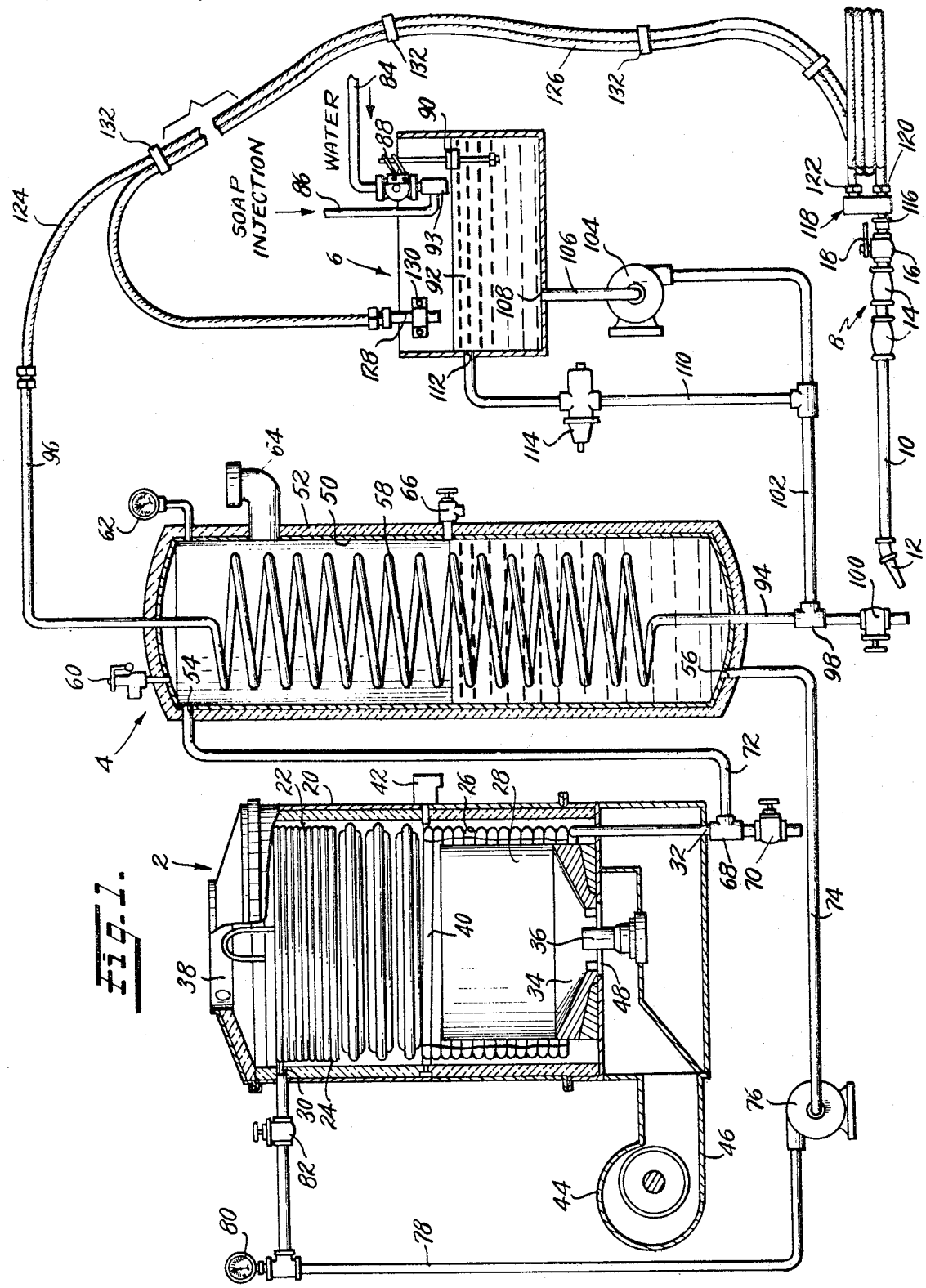
FIG. 1 is a schematic view, partly in section, of the preferred embodiments of the instantaneous high-impact cleaning system for producing a cleaning jet of steam, and wherein a thermostat valve is connected adjacent to the control valve of a wand-type nozzle or cleaning gun, and a return conduit extends from the thermostat valve to the liquid supply tank.

Referring now to FIG. 1, the instantaneous high-impact cleaning system shown includes a steam generator 2, a heat exchanger 4 connected in a closed-loop, circulating system with the steam generator, a liquid or solution supply tank 6, and a nozzle assembly 8. The nozzle assembly 8 is of the gun or wand-type, and has a tubular body 10 fitted with a discharge nozzle 12 at its outer end, and provided with insulated hand grips 14. A conventional flow control valve 16 is connected to the inlet of the tubular body 10 and has an operating handle 18.

While the nozzle 8 is of the wand-type, it is to be understood that the invention is in no way limited to use with a particular type of cleaning gun. For example, the invention can be utilized with the nozzle assembly of a car washing apparatus, such as is employed to direct cleaning jets or steam and/or hot water against the wheels and tires of a vehicle to effect cleaning thereof.

The steam generator 2 is conventional and includes a housing 20 within which is disposed a heating coil or boiler 22, comprising a pancake coil upper section 24, and a helical lower water wall section 26 containing a sheet metal combustion chamber liner 28. The coil 22 is continuous and has an inlet 30 at the upper pancake end thereof, and an outlet 32 at the lower end of the water wall section 26.

The lower end of the housing 20 contains a combustion chamber 34, into which a burner nozzle 36 projects for injecting fuel into the combustion chamber 34. The upper end of the housing 20 has a flue 38 for the escape of combustion gases, the burning fuel functioning to heat the liquid in the coil 22. A ring thermostat tube 40 is disposed at the base of the pancake coil 24 and is connected with a thermostat control 42 that controls the supply of fuel to the burner nozzle 36, whereby control is maintained over the temperature of the water in the coil 22. A blower 44 supplies air to the combustion chamber 34 through a duct 46 and an opening 48 at the lower end of said chamber.

The heat exchanger 4 includes a vertical pressure vessel 50 covered with insulating material 52, and having a steam inlet 54 at its upper end and a heating-water outlet 56 in its lower end. A heat exchange coil 58 extends vertically throughout nearly the full height of the vessel 50, and is helically wound for substantially the entire length thereof. Thus, the coil 58 is disposed within the vessel in a manner to provide maximum exposure thereof to the steam and hot water within the vessel 50. The vessel 50 is fitted with a steam pop-off relief valve 60, a steam pressure gauge 62, and a chemical treatment opening 64. It is necessary for the heating liquid to be of a given volume and this volume is determined by filling the coil 22 and providing a certain liquid level in the vessel 50. Thus, a drain valve 66 is mounted on the sidewall of the vessel 50 about midway of the height thereof, to insure a liquid level within the vessel at that height, when the coil 22 is full.

The outlet 3 of the heating coil section 26 has one side of a T-fitting 68 connected thereto, a drain valve 70 being connected to the other side of said fitting. The stem of the T-fitting 68 has one end of a conduit 72 connected thereto, the other end of which is connected to the heat exchanger inlet 54 to supply steam to the pressure vessel 50. The outlet 56 of the vessel 50 is connected by a conduit 74 to the inlet of a circulating pump 76. The outlet of the pump 76 is connected by a conduit 78, having a pressure gauge 80, and a valve 82, with the inlet 30 of the heating coil 22. Thus, the heating coil 22 and the pressure vessel 50 are connected to provide a closed circulating system for the liquid heating medium.

The closed system provides for continuous circulation and reuse of the same heating medium, which may be water or any other suitable medium. If water with a high degree of purity is utilized as the heating meduim, there will be no build-up of scale, or any corrosion in the system, and this provides the important advantage of prolonging heating coil life. The system is operated so that normally the pressure vessel 50 will be filled with water to the level of the valve 66. The hot liquid flashes into steam upon entering the vessel 50 and condenses into water as heat is withdrawn therefrom. Such water collects in the lower part of the vessel 50 and is continuously withdrawn from said vessel through the outlet 56 by the circulating pump 76. Liquid to be heated by the heat exchanger 4 is passed vertically upwardly through the heat exchange coil 58. The portion of the coil 58 within the lower or water-containing portion of the vessel 50 serves to preheat the liquid before it is passed to the upper portion of the coil 58, where it is exposed to the higher temperature of the steam. Obviously, the temperature attained by liquid passing through the heat exchange coil 58 can never be greater than the temperature of the steam entering the vessel 50 through the inlet 54, which steam temperature is automatically maintained by steam pressure control of the burner.

The liquid supply tank 6 is supplied with water from a conduit 84 and with soap solution from a conduit 86, both of said conduits discharging into the tank 6. The supply of water is controlled by a float valve 88 operated automatically by a float 90. The float valve 88 functions to maintain the liquid solution 92 at a substantially constant depth within the tank 6. The solution may comprise water, to which is added liquid soap or the like, injected into the tank 6 through an injector 93, in a desired proportionate mixture.

The heat exchange coil 58 has an inlet end 94 and an outlet end 96, the former being connected to one side of a T-fitting 98. A drain valve 100 is connected to the other side of the fitting 98, and the stem of said fitting is connected by a conduit 102 with the outlet of a continuously operating solution supply pump 104. The inlet of the supply pump 104 is connected by a conduit 106 with an outlet port 108 in the bottom of the supply tank 6. A by pass conduit 110 is connected between the conduit 102 and a port 112 in the sidewall of the supply tank 6, through a pressure-operated bypass valve 114 that automatically opens when pump pressure in the conduit 102 exceeds a predetermined value.

Connected to the inlet of the valve 16 on the nozzle 8 is the outlet port 116 of a conventional 3-port valve or thermally responsive valve 118. The thermostat valve 118 further includes an inlet port 120 and a bypass port 122, and is of the type wherein when the fluid temperature in the valve rises above a preset value, the inlet port 120 and the outlet port 116 will be interconnected; when fluid temperature falls below said preset value, the outlet port 116 will be closed and instead a flow path will be established between the inlet port 120 and the bypass port 122.

The valve inlet port 120 is connected by a conduit 124 with the outlet end 96 of the heat exchange coil 58, which conduit 124 can be a flexible hose, many feet in length. A bypass return conduit 126 is connected at one end thereof to the valve bypass port 122, and at its other end to a pipe 128 secured by a clamp 130 to the inner wall of the supply tank 6. The return conduit 126 thus functions to return fluid bypassed by the thermostat valve 118 to the liquid supply tank 6. The conduit 126 can also be a flexible hose, and for ease of handling is secured by spaced clamps 132 to the flexible conduit 124.

To operate the system of FIG. 1, the steam generator 2 is placed in operation to establish a desired steam pressure and temperature within the pressure vessel 50. Typically, when a jet of at least 10% steam is desired from the nozzle 12 it has been found that a steam temperature of about 340° F. within the pressure vessel 50 is proper. The normally constantly operating pump 104 is then placed in operation, and liquid solution 92 is pumped through the vertical coil 58 to be heated. The temperature of the liquid is thus raised to nearly the steam temperature within the pressure vessel 50 before the liquid flows into the conduit 124.

For high pressure jet steam cleaning, the thermally responsive valve 118 at the cleaning gun 8 is set at about 320° F., so that when the fluid temperature at the valve 118 falls below that value, fluid will be bypassed into the conduit 126 for return to the tank 6. When the temperature at the valve 118 is at or above the preset value, the bypass valve 118 closes. When the temperature at the valve 118 is above the preset value and the nozzle control valve 16 is closed, no flow occurs through the coil 58. The pressure oeprated bypass valve 114 then operates to open and relieve line pressure, the pump 104 operating continuously, as has been described. Alternatively, the pump 104 could be wired for operation in response to opening and closing of the nozzle valve 16.

If the nozzle valve 16 is not operated for a long period, the fluid temperature in the length of conduit 124 will fall below the desired value, as set on the thermostat valve 118. When this occurs, the valve 118 will automatically operate to interconnect ports 120 and 122 and bypass fluid through conduit 126 to the tank 6, whereupon flow of hot fluid from the coil 58 through the conduit 124 will occur, until the fluid temperature at the valve 118 rises above the preset value, causing the valve to close the bypass to conduit 126. In this manner, an instantly ready supply of steam at the nozzle valve 16 is assured at all times.

When there is no flow through the conduit 124, fluid must of necessity stand within the heat exchange coil 58. Overheating of this fluid cannot occur, since the maximum temperature attainable cannot exceed the steam temperature within the pressure vessel 50. Thus, the common problem of over-heated fluid, present in conventional steam cleaners, where the fluid is contained in coils exposed directly to a fuel-burning heat source, is not present in the instant system.

Figure 2:
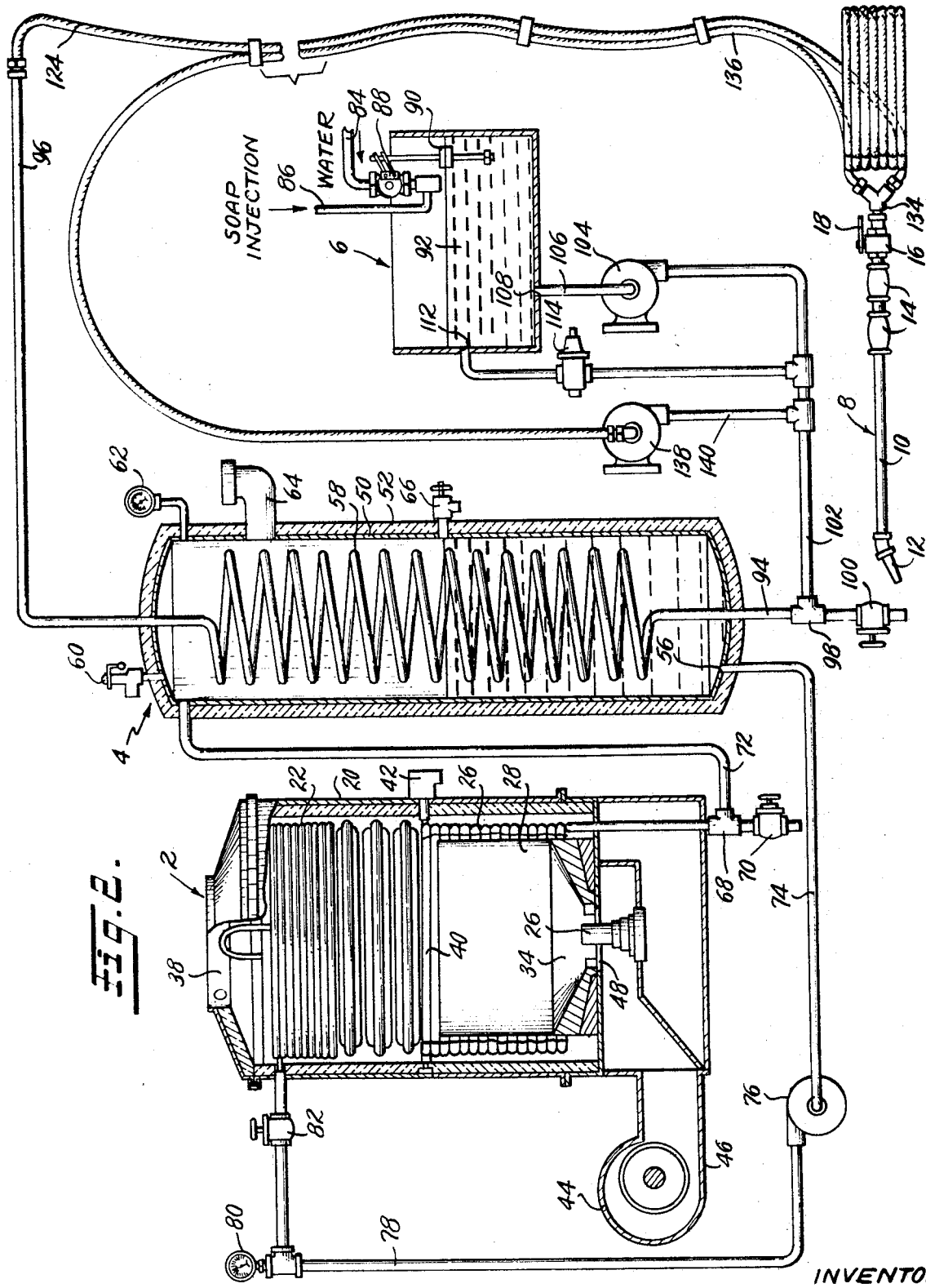
FIG. 2 is a modification of the system shown in FIG. 1, wherein the thermostat valve is replaced by a Y-fitting, and a recirculating pump is connected in a bypass conduit between the fitting and the heat exchange coil supply conduit.

The system of FIG. 2 is identical to that of FIG. 1, except that a solution circulating pump arrangement is utilized, instead of the thermally responsive valve 118 and the return conduit 126, to assure a ready supply of fluid at the desired temperature at the control valve 16. Where the elements in FIG. 2 are identical with the elements in FIG. 1, the same reference numerals have been applied.

The main leg of a Y-fitting 134 is connected to the inlet of the nozzle valve 16, and the outlet end of the conduit 124 is connected to a branch leg of said fitting. The remaining leg of the fitting 134 is connected by a flexible conduit 136 to the inlet of a normally continuously operating solution circulating pump 138, the outlet of which is connected by a conduit 140 to the solution supply conduit 102. The circulating pump 138 has a low capacity of from about one-fourth to one-half gallon per minute (compared to a capacity of about 250 g.p.h. for the main solution supply pump 104), but is of sufficient size to effect a continuous circulation of solution within the system so that fluid of the desired temperature is always instantly available to the nozzle 8.

The systems of FIGS. 1 and 2 are designed to deliver a high pressure jet of steam when the nozzle valve 16 is opened. In some instances, a high-impact jet of hot water, rather than steam, is desired, and a system for delivering such a jet of hot water is shown in FIG. 3, wherein components like those in FIGS. 1 and 2 bear like reference numerals.

Figure 3:
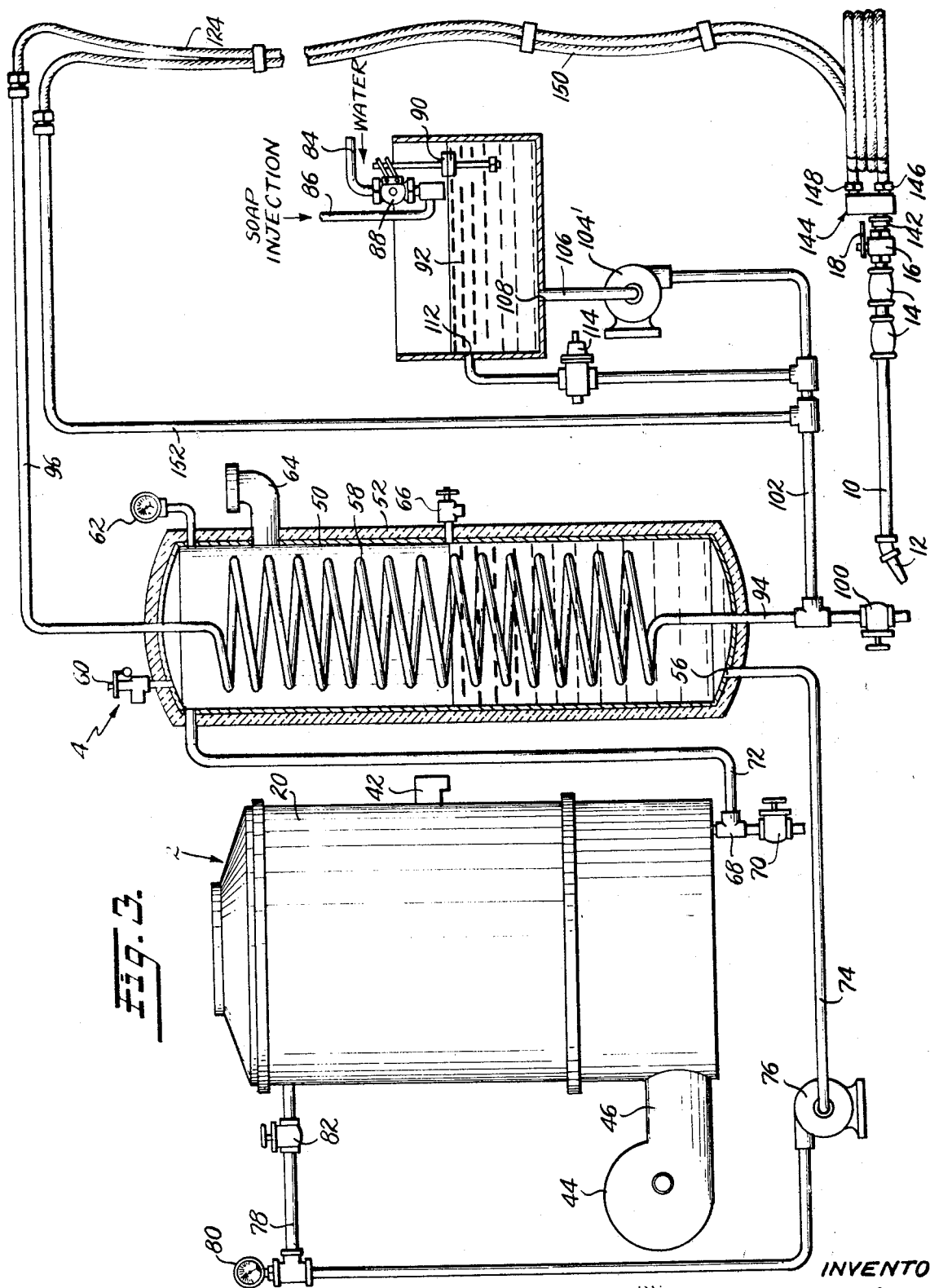
FIG. 3 is a schematic view, partly in section, showing a hot water cleaning system including a thermostat controlled blending valve at the inlet of the nozzle control valve for blending cold water with the discharge from the heat exchange coil outlet, the thermostat valve being connected by a conduit with the supply conduit leading to the heat exchange coil.

In FIG. 3 a solution supply pump 104' of about twice the capacity of the pump 104, or about 500 g.p.h. is utilized so that liquid is passed through the heat exchange coil 58 about twice as fast as in FIGS. 1 and 2. This more rapid movement of the liquid allows less time for heating of the liquid within the 340° F. pressure vessel 50. Alternatively, the steam temperature and pressure within the vessel 50 can be lowered to about 250° F. and 15 p.s.i. respectively, with a pump capacity of 250 g.p.h. In either instance, fluid issuing through the heating coil discharge end 96 will heat the solution in coil 58 to substantially above boiling temperature.

Connected to the inlet of the nozzle valve 16 in FIG. 3 is the outlet port 142 of a thermally responsive blending valve 144, having two inlet ports 146 and 148. The inlet port 146 is connected to the conduit 124, and thus receives fluid from the heat exchange coil 58. The inlet port 148 is connected to the outlet end of a flexible conduit 150, the other end of which is connected to a conduit 152 leading from the liquid supply conduit 102.

The blending valve 144 is set to open for flow from the conduit 150, whenever the fluid temperature exceeds an adjustable preset value of about 120° F. to 180° F. When the blending valve 144 and the nozzle valve 16 are open, unheated solution from the line 102 is blended in valve 144 with the hot liquid from the line 124 to provide a liquid jet discharge of the desired temperature. Thus, the system of FIG. 3 functions to instantly make available liquid of the desired temperature when the valve 16 is opened.

Because the temperature within the conduit 124 will normally be many degrees above that desired for the liquid jet, the loss of heat from liquid within the conduit 124 during periods of nonuse will normally not be detrimental. Hence, the thermostat bypass valve arrangement of FIG. 1 and the circulating pump arrangement of FIG. 2 normally are not necessary in FIG. 3, although it would obviously be possible to utilize such in the conduit 124 of FIG. 3 just ahead of the blending valve 144, if so desired.

Figure 4:
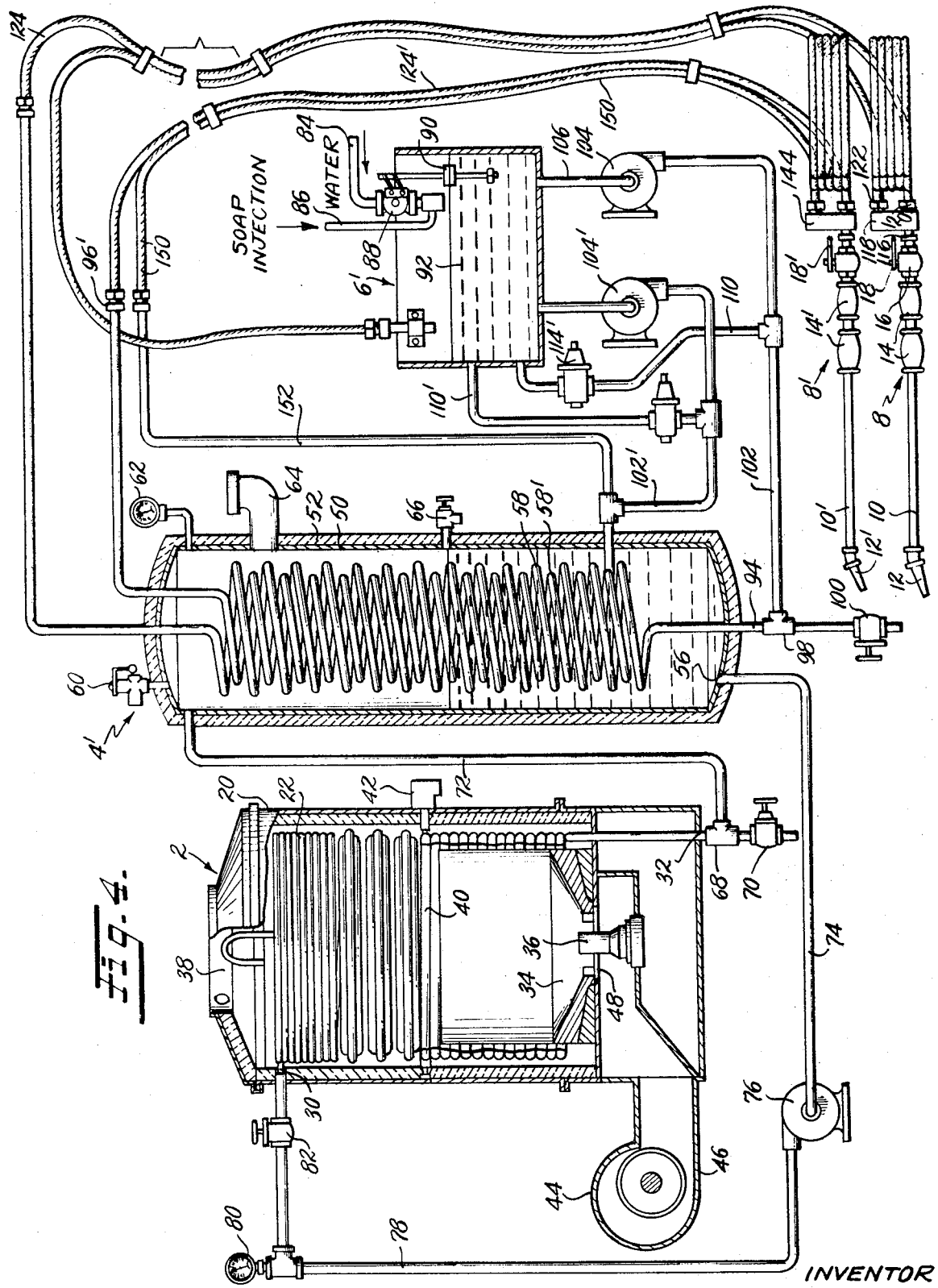
FIG. 4 is a schematic view, partly in section, of a combined hot water and steam cleaning system, wherein two heat exchange coils and two supply pumps are utilized so that both a hot water jet and a steam jet can be discharged at the same time from separate nozzles.

FIG. 4 shows a cleaning system that is a combination of the systems of FIGS. 1 and 3, and wherein a steam generator 2, and a pressure vessel 50 identical to those in FIGS. 1 and 3 are utilized. The heat exchanger 4', however, includes two coils, one coil 58 and another coil 58', one for the steam side of the system and one for the hot water side, respectively. The steam system of FIG. 4 is identical with that of FIG. 1, and the components thereof bear the same reference numerals as in FIG. 1.

The hot water system of FIG. 4 is identical to that of FIG. 3, the pump 104' supplying the heat exchange coil 58' through a conduit 102', a bypass conduit 110' and a bypass valve 114' connecting the conduit 102' to the supply tank 6'. The outlet 96' of the coil 58' is connected by a hose 124' to the inlet of a blending valve 144 connected to the nozzle valve 16' of a nozzle 8'. Unheated blending water is supplied to the blending valve 144 by the conduits 150 and 152, from the conduit 102'.

The combined system of FIG. 4 can provide either a jet of steam or a jet of hot liquid, depending upon which nozzle 8 or 8' is utilized. If both nozzle assemblies 8 and 8' are to be used at the same time, for prolonged periods, then the capacity of the steam generator 2 and the heat exchanger 4' must be increased.

Figure 5:
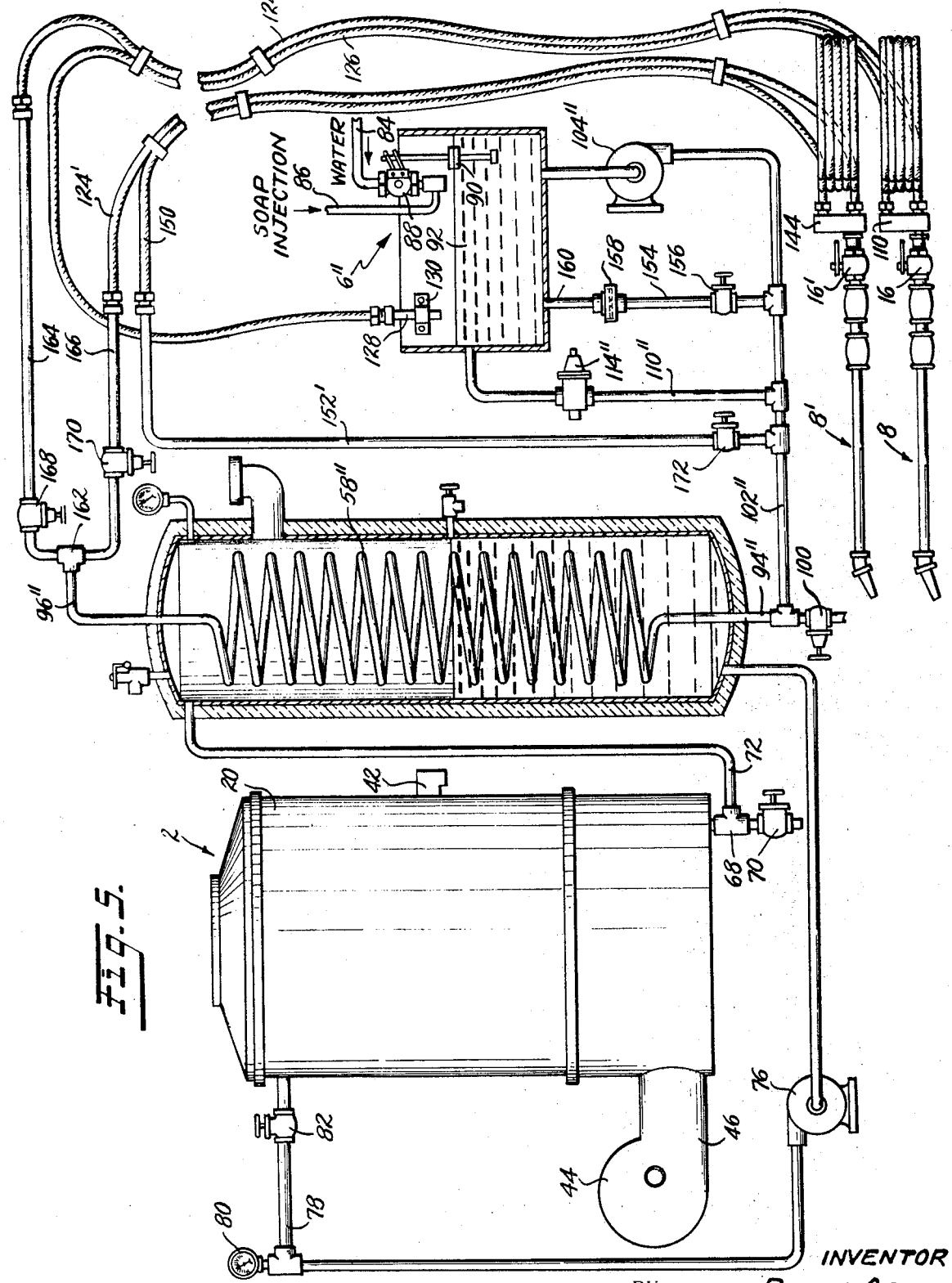
FIG. 5 is a schematic view, partly in section, of a combined hot water and steam cleaning system utilizing a single heat exchange coil, but operable to separately produce either a steam or hot water jet.

Another combined steam and hot water system, utilizing but a single heat exchange coil 58", is shown in FIG. 5. The system of FIG. 5 can be utilized to produce either a jet of steam, or a jet of hot water, but not both at the same time.

The inlet end 94" of the coil 58" in FIG. 5 is supplied with liquid through a conduit 102" from a high capacity pump 104" (500 g.p.h.) identical to the pump 104' in FIG. 3. A bypass conduit 110" and bypass pressure operated valve 114" relieve pressure in the system, as in FIGS. 1–4. Connected to the conduit 102" between the pump 104" and the conduit 110" is a conduit 154, which leads through a valve 156 and a metering orifice 158 to a port 160 in the supply tank 6".

The supply pump 104" is a constant speed pump of high capacity, which is utilized when it is desired to supply a hot water jet. Under such operating conditions, as has been mentioned, it is necessary to pass liquid solution through the heat exchange coil 58" at a rapid rate of flow. When a steam jet is wanted, the flow rate through the coil 58" must be lessened, and this is accomplished by opening the valve 156 to bypass a metered quantity of the supply pump's 104' discharge through the orifice 158 back to the tank 6".

Alternatively to the conduit 154, the valve 156 and the orifice 158, a variable output supply pump, or two separate supply pumps, can be employed.

Connected to the outlet end 96" of the heat exchange coil 58" is the center leg of a T-fitting 162, and connected to one side of said fitting is a pipe 164 to which the flexible conduit 124 leading to the steam nozzle 8 is coupled. The other side of the T-fitting 162 is connected by a pipe 166 to the flexible conduit 124' supplying hot water to the nozzle 8', the conduits 164 and 166 having flow control valves 168 and 170, respectively, connected therein. The line 152' leading to the conduit 150 supplying the thermostat blending valve 144, has a flow control valve 172 therein, for isolating conduit 152' when the steam side of the system is in operation.

When a hot water jet is wanted, the nozzle 8' is employed, and the valves 156 and 168 are closed. The valves 170 and 172 are opened, and thereafter the apparatus of FIG. 5 functions like the system of FIG. 3. When a steam jet is wanted, the nozzle 8 is utilized. The valves 170 and 172 are then closed, and the valves 168 and 156 are opened. The apparatus of FIG. 5 will then function like the apparatus of FIG. 1, to produce a jet of steam.

Obviously, many modifications and variations of the invention are possible in the light of the above teachings. It is, therefore, to be understood that the invention can be practiced otherwise than as specifically shown and described.

I claim:
1. A cleaning system for discharging a heated jet of high pressure fluid, comprising: a heat exchanger including a pressure vessel having a heat exchange coil extending therethrough, said heat exchange coil having an inlet and an outlet; a supply conduit and supply pump connected with the inlet of said heat exchange coil for supplying cleaning liquid thereto; a discharge nozzle including a nozzle control valve; means connecting the outlet of said heat exchange coil with said nozzle control valve; and a steam generator connected with said pressure vessel for supplying heated fluid thereto to maintain a desired substantially uniform steam pressure and temperature in said pressure vessel, whereby liquid passing through said heat exchange coil to said nozzle is heated by the fluid within said pressure vessel to a desired substantially constant temperature.

2. A cleaning system as recited in claim 1, wherein the means connecting the outlet of said heat exchange coil with the nozzle control valve includes a three-legged fitting, one of the legs of said fitting being connected with the inlet of said nozzle control valve and a first conduit connecting the outlet of said heat exchange coil with a second leg of said fitting; and a second conduit connecting the third leg of said fitting with the supply conduit downstream of the supply pump, said second conduit having a continuously operating pump connected therein for continuously bypassing a portion of the fluid delivered to said three-legged fitting from said heat exchange coil.

3. A cleaning system for instantly providing on demand, a heated jet of high pressure fluid, comprising: a heat exchanger including a pressure vessel having a heat exchange coil extending therethrough; said heat exchange coil having an inlet and an outlet; means connected with said pressure vessel for supplying heated fluid thereto to maintain a desired substantially uniform pressure and temperature in said pressure vessel; means connected with the inlet of said heat exchange coil for supplying liquid thereto to be heated; a discharge nozzle assembly including a flow control valve; and means connecting the outlet of said heat exchange coil with said flow control valve including conduit means and means for continuously maintaining a supply of heated cleaning fluid above a given temperature available between said heat exchange coil outlet and said flow control valve, whereby to instantly provide heated fluid at a temperature at least as high as said given temperature to said discharge nozzle assembly when said flow control valve is opened.

4. A cleaning system as recited in claim 3, wherein the pressure vessel includes an inlet and an outlet, and wherein the means connected with said pressure vessel for supplying heated fluid thereto includes; a steam generator including a heating coil having an inlet and an outlet; and a circulating pump, the outlet of said heating coil being connected with the inlet of said pressure vessel, and the outlet of said pressure vessel being connected through said circulating pump with the inlet of said heating coil, whereby said pressure vessel and said heating coil are connected in a closed circulating system.

5. A cleaning system as recited in claim 3, wherein the means for supplying liquid to the inlet of the heat exchange coil comprises: a liquid supply tank; a supply conduit connecting said tank with the inlet of said heat exchange coil; and a liquid supply pump connected in said supply conduit.

6. A cleaning system as recited in claim 5, including a bypass conduit connected between the supply conduit at a point downstream of the supply pump and the supply tank; and a pressure responsive bypass valve connected in said bypass conduit means.

7. A cleaning system as recited in claim 5, wherein the means connecting the outlet of the heat exchange coil with the flow control valve includes: a thermally responsive valve positioned just in advance of said flow control valve, and having an outlet port, an inlet port, and a bypass port, said outlet port being connected with said flow control valve, and wherein the conduit means is connected between the outlet of said heat exchange coil and said inlet port of said thermally responsive valve; and second conduit means connected between said bypass port of said thermally responsive valve and said liquid supply tank, said thermally responsive valve being constructed to establish flow between said inlet and outlet ports in response to a given fluid temperature, and to establish bypass flow between said inlet port and said bypass port when the fluid temperature at said thermally responsive valve falls below said given temperature to thereby bypass such fluid to said liquid supply tank through said second conduit means and to draw heated fluid from said heat exchange coil to said thermally responsive valve.

8. A cleaning system as recited in claim 5, wherein the means connecting the outlet of said heat exchange coil with the flow control valve includes: a thermally responsive valve positioned just in advance of said control valve and including an outlet port, and two inlet ports, said outlet port being connected with said flow control valve, and wherein the conduit means of said connecting means is connected between the outlet of said heat exchange coil and one of said inlet ports of said thermally responsive valve; and second conduit means connected to the supply conduit downstream of the supply pump and with the other of said inlet ports of said thermally responsive valve, said thermally responsive valve being designed and arranged to establish flow between said other inlet port and said outlet port when the temperature of fluid at said one inlet port rises above a selected value, whereby relatively cool fluid from the supply conduit is blended with the hot fluid from said heat exchange coil and delivered to said thermally responsive valve.

9. A dual cleaning system for instantly providing on demand a high pressure steam cleaning jet and/or a high pressure liquid cleaning jet, comprising: a heat exchanger including a pressure vessel having first and second heat exchange coils extending therethrough, each of said heat exchange coils having an inlet and an outlet; means connected with said pressure vessel for supplying heated fluid thereto to maintain a desired substantially uniform steam pressure and temperature in said pressure vessel; means for supplying cleaning liquid to said heat exchange coils comprising a supply tank and a first and a supply second conduit connecting said supply tank with the inlet of the respective heat exchange coils; a supply pump connected in each of said first and second supply conduits; a steam discharge nozzle assembly including a first flow control valve; a first thermally responsive valve located just in advance of said first flow control valve, said first thermally responsive valve having an outlet port, an inlet port, and a bypass port, said outlet port being connected with said first flow control valve; a first delivery conduit connecting the outlet of said first heat exchange coil with said inlet port of said first thermally responsive valve; a bypass conduit connecting the bypass port of said first thermally responsive valve for discharge of fluid into said liquid supply tank, said first thermally responsive valve being constructed to establish flow between said inlet and outlet ports in response to a given fluid temperature and to establish bypass flow between said inlet port and said bypass port when the fluid temperature at said inlet of said first thermally responsive valve falls below said given temperature to thereby bypass such fluid to said liquid supply tank through said bypass conduit and to draw heated fluid from said first heat exchange coil to said first thermally responsive valve through said first delivery conduit; a liquid discharge nozzle assembly including a second flow control valve; a second thermally responsive valve located just in advance of said second flow control valve, said second thermally responsive valve having an outlet port and a first and second inlet port, said outlet port being connected with said second flow control valve; a second delivery conduit connecting the outlet of said second heat exchange coil with said first inlet port of said second thermally responsive valve; and a third supply conduit for relatively cool cleaning liquid connecting the second of said inlet ports of said second thermally responsive valve with said second supply conduit at a point downstream of said second supply pump, said second thermally responsive valve being designed and arranged to establish flow between said second inlet port and said outlet port of said second thermally responsive valve when the temperature of the fluid at said first inlet port rises above a selected value, whereby relatively cool fluid from said third supply conduit is blended with the hot fluid from said second heat exchange coil delivered to said second thermally responsive valve to produce a jet of hot liquid.

10. A dual cleaning system for instantly providing on demand a high pressure steam cleaning jet and/or a high pressure liquid cleaning jet, comprising: a heat exchanger including a pressure vessel having heat exchange coil means extending therethrough having an inlet and an outlet; means connected with said pressure vessel for supplying heated fluid thereto to maintain a desired substantially uniform steam pressure and temperature in said pressure vessel; means for supplying cleaning liquid to said heat exchange coil means comprising a supply tank and a supply conduit connecting said supply tank with the inlet of said heat exchange coil means; a supply pump connected in said supply conduit; a steam discharge nozzle assembly and a liquid discharge nozzle assembly; means including conduits for selectively connecting said discharge nozzles with the outlet of said heat exchange coil means; a thermally responsive valve in the conduit means connected with each of said nozzle assemblies; means connected with the thermally responsive valve in the conduit means connected with said steam nozzle assembly for bypassing fluid from said heat exchange coil means at said steam nozzle assembly and returning it to said supply tank when the temperature of said fluid at said steam nozzle assembly is below a given value; and means for delivering relatively unheated fluid to the other thermally responsive valve associated with said liquid discharge nozzle assembly when the temperature of the fluid delivered thereto from said heat exchange coil means is above said given value.

11. A cleaning system as recited in claim 10, including a conduit having an orifice restriction and a valve installed therein, connecting the supply tank with the supply conduit at a point downstream of the supply pump.

References Cited

UNITED STATES PATENTS

| | | | |
|---|---|---|---|
| 2,755,130 | 7/1956 | Arant | 239—305 X |
| 2,790,678 | 4/1957 | Arant | 239—137 |
| 2,919,070 | 12/1959 | Arant | 239—304 |
| 2,943,797 | 7/1960 | Neilson | 239—305 |

EVERETT W. KIRBY, Primary Examiner

T. C. CULP, JR., Assistant Examiner

U.S. Cl. X.R.

122—33; 126—362; 239—137, 304